Oct. 28, 1941.   J. J. SHIELDS   2,260,587
FLEXIBLE CONVEYER
Filed May 17, 1940   4 Sheets-Sheet 1
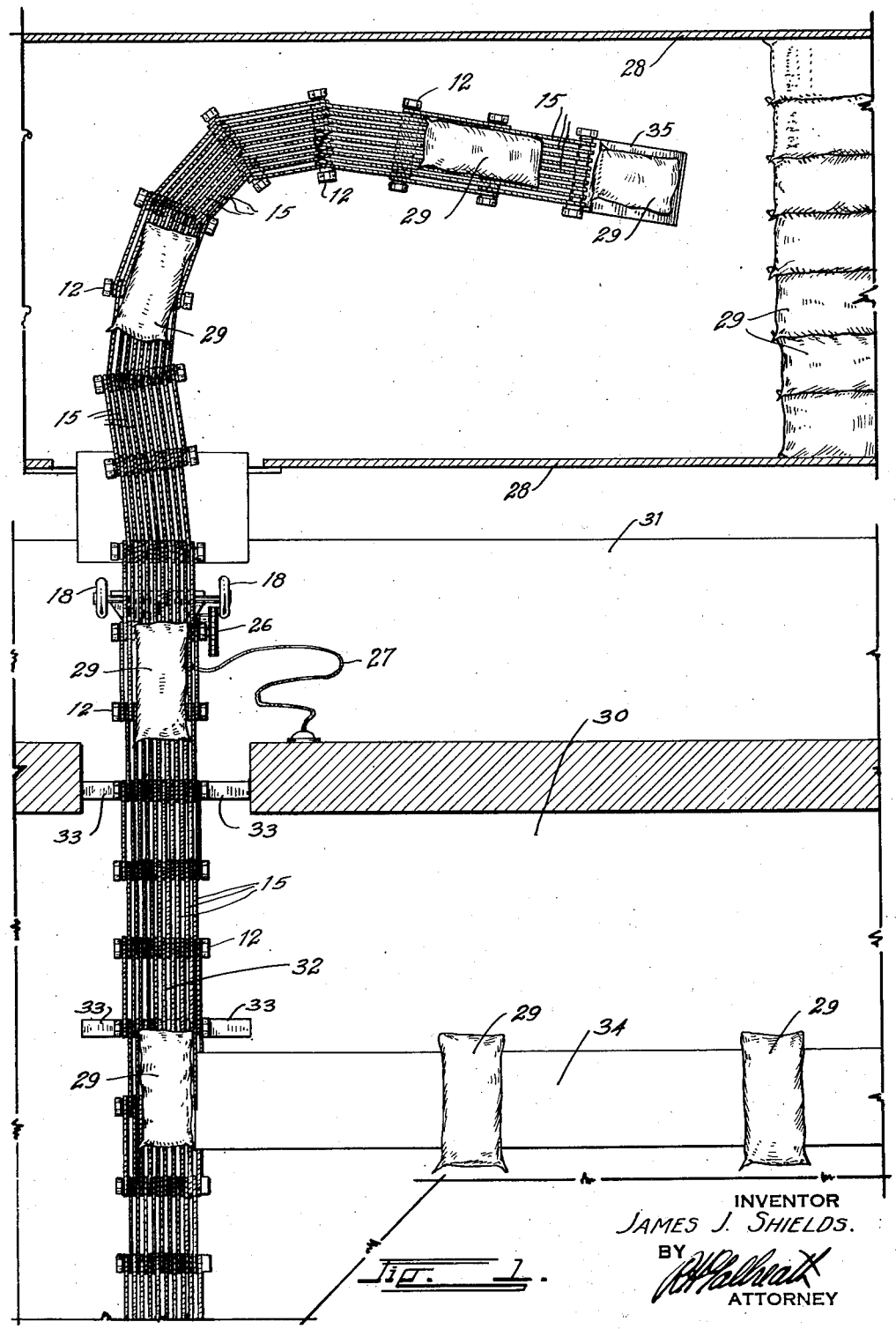
INVENTOR
JAMES J. SHIELDS.
BY
ATTORNEY

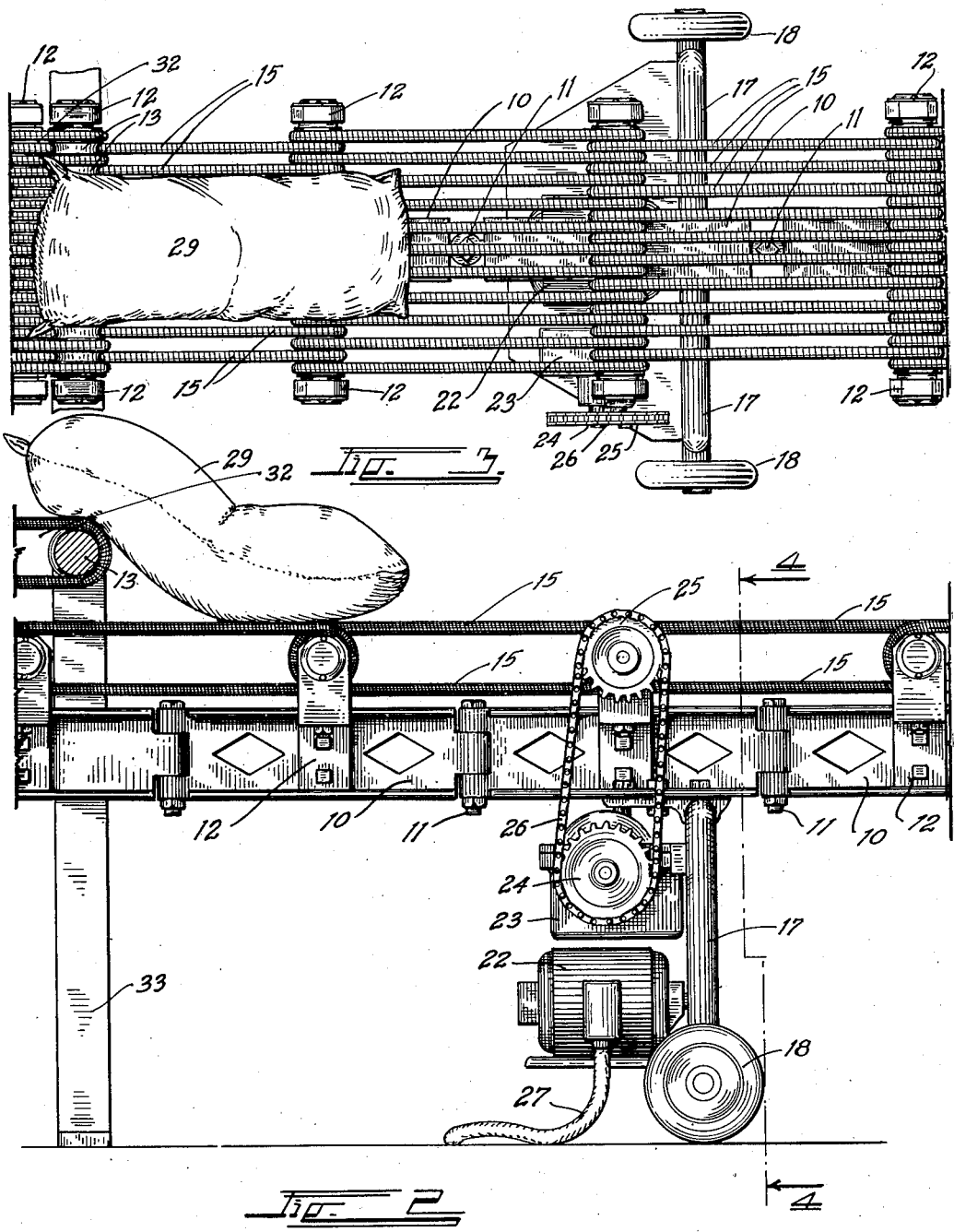

Oct. 28, 1941.       J. J. SHIELDS       2,260,587
FLEXIBLE CONVEYER
Filed May 17, 1940       4 Sheets-Sheet 3
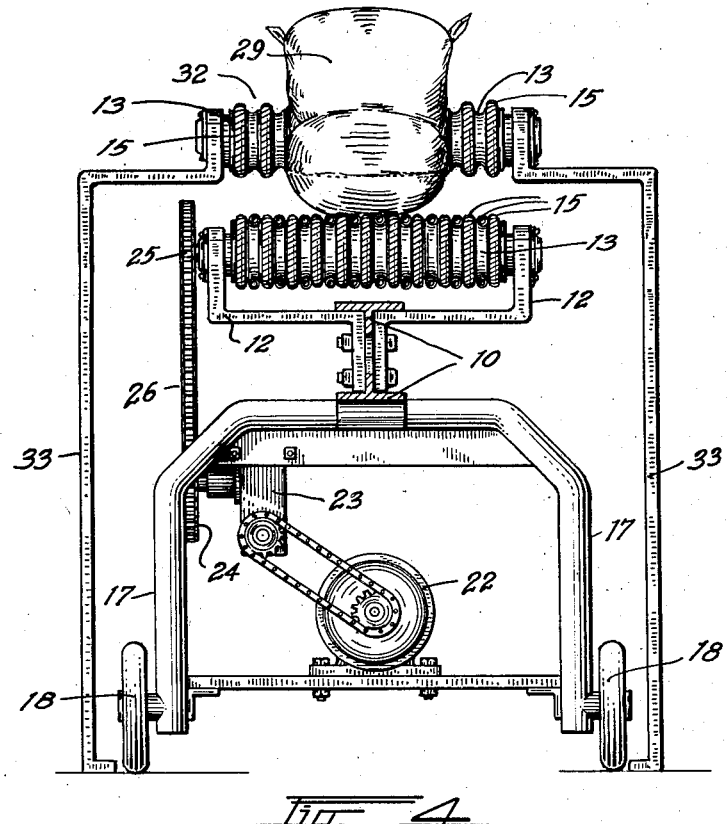
Fig. 4.
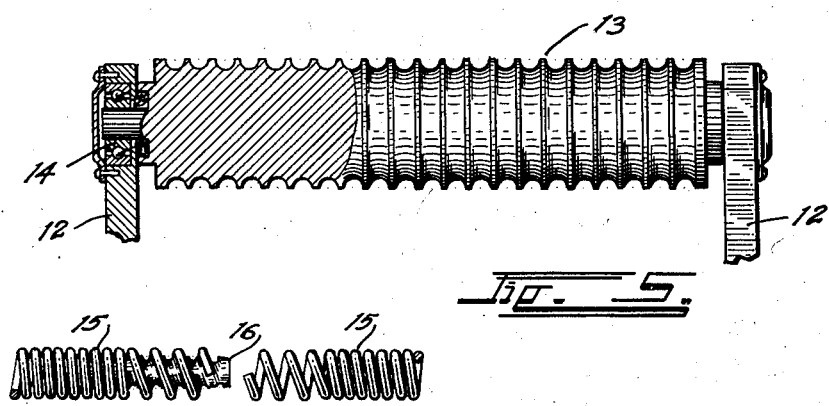
Fig. 5.
Fig. 6.
INVENTOR
JAMES J. SHIELDS.
BY
ATTORNEY Oct. 28, 1941.   J. J. SHIELDS   2,260,587
FLEXIBLE CONVEYER
Filed May 17, 1940   4 Sheets-Sheet 4
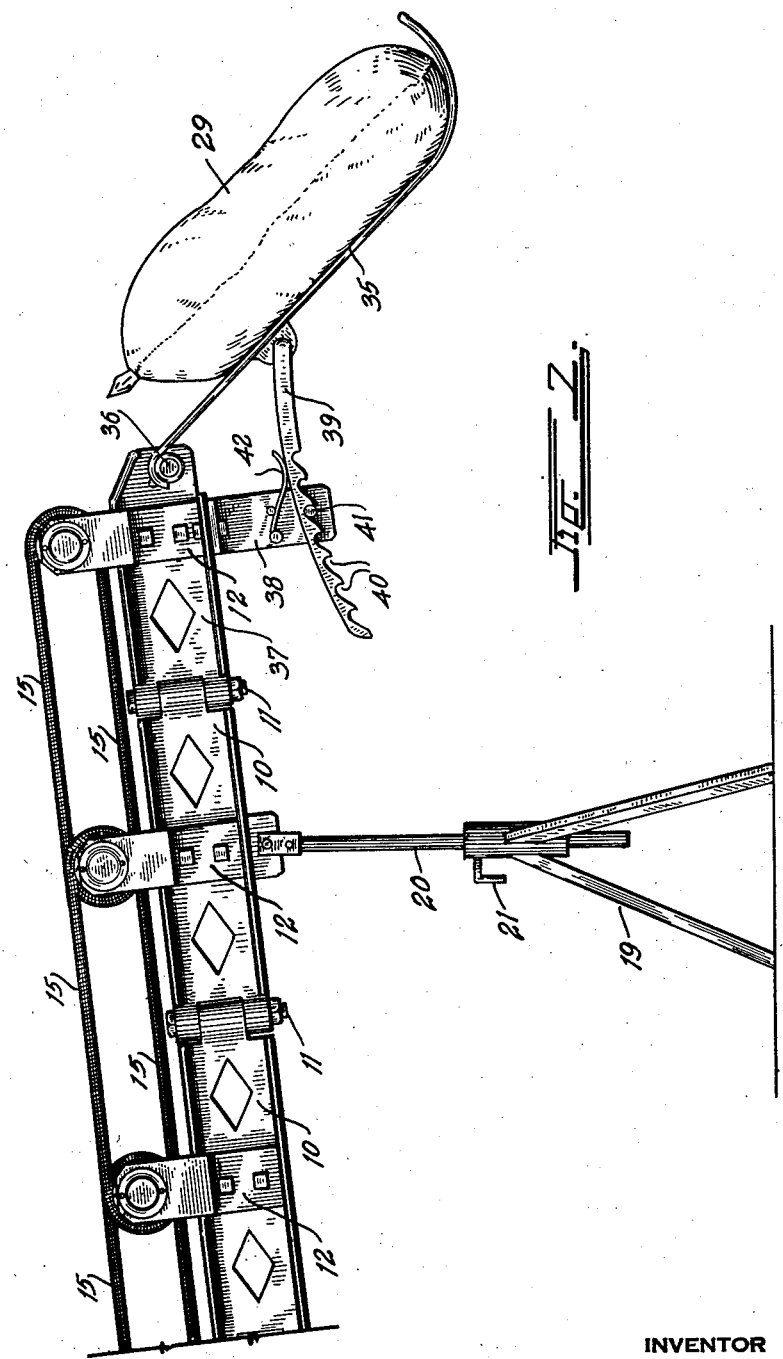
INVENTOR
JAMES J. SHIELDS.
BY
ATTORNEY Patented Oct. 28, 1941

2,260,587

UNITED STATES PATENT OFFICE 2,260,587

FLEXIBLE CONVEYER

James J. Shields, Longmont, Colo.

Application May 17, 1940, Serial No. 335,794

7 Claims. (Cl. 198—109)

This invention relates to a conveyer for transporting articles from place to place and more particularly to a device of this character for loading and unloading freight, baggage, mail and the like in cars or trucks.

The principal object of this invention is to provide a flexible conveyer which can be bent or curved as required to convey the material along any desired path regardless of how tortuous or curvated the path may be and to so construct the device that the path thereof may be changed as desired during a loading operation without stopping the conveyer or interfering with its operation in any way.

Another object of the invention is to provide a construction which will carry bag or boxes along any desired curvated path without the use of side boards or retaining walls along the conveyer.

A further object is to provide a sectional conveyer, that is one to which additional sections may be quickly and easily added or removed to provide any desired lengths and to provide a conveyer which will be easily portable so that it can be transported to any place about a plant where its use is desirable.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved conveyer illustrating it as it would appear when used for loading a box car with sacked goods such as sugar or the like.

Fig. 2 is an enlarged fragmentary side view of a portion of the improved conveyer illustrating the driving and supporting mechanism.

Fig. 3 is a plan view of the portion shown in Fig. 2.

Fig. 4 is a cross section through the conveyer taken on the line 4—4, Fig. 2.

Fig. 5 is a detail view, partly in section, illustrating the type of roller used in the improved conveyer.

Fig. 6 is a detail view illustrating the method of joining the ends of the coiled conveyer springs.

Fig. 7 is a fragmentary side view of the discharge extremity of the flexible conveyer.

The improved conveyer consists of a series of frame members 10, hinged together at their extremities upon hinge bolts 11 so that the entire series can be freely bent or turned in any desired path or direction.

At the middle of each frame member is a pair of roller brackets 12 extending oppositely outward and upward from each side of the frame member. Each pair of roller brackets supports a conveyer roller 13 in suitable ball bearings 14.

The rollers are formed with a series of adjacent annular grooves 15 throughout their lengths for receiving a plurality of elastic, spring-like, endless, belts 15. The belts are preferably formed of tubular coiled-wire springs but may be formed of any desired material which will allow them to be stretched or contracted at will. If formed of coiled-wire springs as illustrated the extremities of each coil are joined as illustrated in Fig. 6 to form an endless belt. The joint is accomplished by spreading the wire turns apart at the extremities; inserting a flexible raw hide plug 16 in one extremity; then threading the two extremities together over the plug.

The belts on each roller alternate, that is each alternate belt extends to and around the next alternate roller on the right and the intermediate belts similarly extend to and around the next alternate roller on the left, throughout the length of the conveyer. The belts serve both as driving and as conveying members.

A wheeled frame 17 is secured below one of the frame members 10 adjacent one extremity of the conveyer and supports the latter on a pair of wheels 18. The other extremity of the conveyer is supported from a tripod 19 from which a standard 20 arises to a hinged connection with one of the frame members. The standard can be set at any desired degree of extension in the tripod by means of a set screw 21.

The conveyer is driven from a suitable electric motor 22 mounted on the wheeled frame 17 and transmitting its power through a speed reducer 23 to a drive sprocket 24. A driven sprocket 25 is mounted on the shaft of the conveyer roller immediately above the motor and a sprocket chain 26 connects the two sprockets. An electric cord 27 supplies current to the motor. The cord may be plugged into any convenient outlet.

As thus far described the invention forms a complete portable conveyer which may be wheeled on the wheels 18 to any desired location and bent or turned to follow any desired path. The entire conveyer is freely flexible due to the hinged connections of the frame members. When turned on an arc the elastic belts on the outside simply stretch to a longer length while the belts on the inside of the arc contract but all maintain sufficient tension for conveying purpose.

A peculiarity of the improved conveyer is its ability to convey bags, sacks and the like around curves or convolutions without the necessity for side boards or guides and without danger of the articles falling from the belts. It is desired to call attention to the fact that wear in the bearings is reduced to a minimum since the pull of the belts on any given roller is equalized by the oppositely acting tension.

In Fig. 1 a typical set up for loading a box car 28 with sacks of sugar 29 from a warehouse 30 and loading platform 31 is illustrated. In this installation a second conveyer 32 is supported at higher level over the loading conveyer. The second conveyer is carried on arched bearing pedestals 33 in such a way that the loading conveyer can be pulled back under the second conveyer when not in use to allow the warehouse door to be closed.

The loading conveyer is pulled into the car 28 and turned to a convenient loading position therein as illustrated. As the car becomes filled the loading conveyer is gradually backed out under the second conveyer and is then turned and pulled to the other extremity of the car until the entire car is loaded. The bags may be placed on the second conveyer in any desired manner such as by a regular fixed warehouse belt conveyer 34. The second conveyer need not be of the flexible construction.

It will be noted that all sections of the conveyer are similar and additional sections can be easily and quickly added or superfluous sections can be easily removed without affecting the operation of the conveyer.

The discharge extremity of the flexible conveyer may be provided with a bag catcher 35 formed from a sheet metal plate mounted on a hinge bar 36 which extends oppositely outward from the sides of a terminal frame member 37. The lower edge of the plate is rolled upwardly, as illustrated, to retain the bags thereon. A bracket 38 extends downward from the terminal frame member. An adjustable brace arm 39 extends forwardly from the bracket to the bag catcher. The brace arm is provided with ratchet-like notches 40 which engage a pin 41 in the bracket to hold the bag catcher at any desired degree of extension. A leaf spring 42 holds the brace arm against the pin 41. The bags roll from the conveyer and slide down the bag catcher where they are held until removed by the operator.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A flexible conveyer comprising: a series of frame members hinged together to form a continuous flexible frame; roller supporting means on said frame members; a roller mounted in each supporting means; and a series of flexible endless belts extending between the roller of each frame member to the rollers of the two adjacent frame members across the hinge points thereof, said belts stretching and contracting as said frame members are swung in relation to each other.

2. A flexible conveyer comprising: a series of frame members; hinges connecting the adjacent extremities of said frame members to form a continuous flexible longitudinally extending frame; roller supporting means on each of said frame members; a roller mounted in each supporting means; a plurality of spaced grooves formed in said rollers; a series of endless belts riding in said grooves and extending in alternate opposite directions from each roller to the rollers of the next adjacent frame members and over the hinges therebetween, said belts being elastic so that they may stretch or contract as said frame members are swung in relation to each other.

3. A flexible conveyer comprising: a series of frame members; hinges connecting the adjacent extremities of said frame members to form a continuous flexible longitudinally extending frame; roller supporting means on each of said frame members; a roller mounted in each supporting means at right angles to the axis of the frame member, said roller projecting from both sides of the said member; a plurality of parallel annular grooves in each roller; and a plurality of elastic endless belts extending from the adjacent grooves of each roller oppositely outward to the grooves of the rollers of the two adjacent frame members and over the hinges therebetween.

4. A flexible conveyer comprising: a series of frame members; hinges connecting the adjacent extremities of said frame members to form a continuous flexible longitudinally extending frame; roller supporting means on each of said frame members; a roller mounted in each supporting means at right angles to the axis of the frame member, said roller projecting from both sides of the said member; a plurality of parallel annular grooves in each roller; a plurality of elastic endless belts extending from the adjacent grooves of each roller oppositely outward to the grooves of the rollers of the two adjacent frame members; and a wheeled frame portably supporting one of said frame members.

5. A flexible conveyer comprising: a series of frame members hinged together to form a continuous flexible frame; roller supporting means on said frame members; a roller mounted in each supporting means at right angles to the axis of the frame member, said roller projecting from both sides of the said axis; a plurality of parallel annular grooves in each roller; a plurality of elastic endless belts extending from the grooves of each roller oppositely outward to the grooves of the two adjacent rollers; a wheeled frame portably supporting one of said frame members; and a motor carried by said wheeled frame for driving said conveyer.

6. A flexible conveyer comprising: a series of frame members hinged together to form a continuous flexible frame; roller supporting means on said frame members; a roller mounted in each supporting means; a series of flexible endless belts extending between adjacent rollers, said belts stretching and contracting as said frame members are swung in relation to each other; an inclined receiving plate at the discharge extremity of said conveyer; and an upwardly turned extremity on said plate to retain bags thereon.

7. A flexible, portable conveyer comprising: a plurality of horizontally positioned, longitudinally-extending frame members; a vertical hinge joining the adjacent extremities of said frame members to form a continuous, horizontally flexible frame; a roller bracket extending outward from each side of each frame member; a roller supported in the roller brackets of each frame member and extending laterally across the top thereof; each roller being provided with a plurality of parallel belt grooves; a series of endless elastic belts extending from the alternate grooves of each roller to the alternate grooves of the rollers in the frame members at each side of that roller, the flexibility of said belts allowing them to stretch and contract to accommodate the angular movement of said rollers as said frame members are swung on their hinges.

JAMES J. SHIELDS.